US007259944B2

(12) United States Patent
Branston et al.

(10) Patent No.: US 7,259,944 B2
(45) Date of Patent: Aug. 21, 2007

(54) METHOD FOR OPERATING A SWITCH WITH A CONNECTABLE CURRENT LIMITER AND CORRESPONDING ARRANGEMENT

(75) Inventors: David Walter Branston, Effeltrich (DE); Karl-Hans Bärnklau, Weiden (DE); Fritz Pohl, Hemhofen (DE); Christian Schreckinger, Kötzting (DE)

(73) Assignee: Siemens Aktiengesellschaft, Munich (DE)

( * ) Notice: Subject to any disclaimer, the term of this patent is extended or adjusted under 35 U.S.C. 154(b) by 105 days.

(21) Appl. No.: 10/475,180

(22) PCT Filed: Apr. 4, 2002

(86) PCT No.: PCT/DE02/01229

§ 371 (c)(1),
(2), (4) Date: Mar. 31, 2004

(87) PCT Pub. No.: WO02/084688

PCT Pub. Date: Oct. 24, 2002

(65) Prior Publication Data

US 2004/0150932 A1 Aug. 5, 2004

(30) Foreign Application Priority Data

Apr. 17, 2001 (DE) ................................ 101 18 746

(51) Int. Cl.
*H02H 3/00* (2006.01)

(52) U.S. Cl. ........................................................ 361/2

(58) Field of Classification Search .................... 362/2; 361/2
See application file for complete search history.

(56) References Cited

U.S. PATENT DOCUMENTS

| | | | |
|---|---|---|---|
| 3,430,016 A * | 2/1969 | Hurtle | 218/1 |
| 3,873,791 A * | 3/1975 | Hurtle | 218/1 |
| 4,417,222 A * | 11/1983 | Schmitt et al. | 335/6 |
| 5,539,370 A | 7/1996 | Arnold | |
| 5,644,283 A | 7/1997 | Grosse-Wilde et al. | |
| 5,777,286 A | 7/1998 | Abot et al. | |
| 5,793,278 A | 8/1998 | Pohl et al. | |
| 6,320,129 B1 * | 11/2001 | Chou et al. | 174/68.1 |
| 6,323,751 B1 * | 11/2001 | Duggal et al. | 338/22 R |

(Continued)

FOREIGN PATENT DOCUMENTS

DE 2439066 8/1974

(Continued)

OTHER PUBLICATIONS

English translation of EP0350825.*

*Primary Examiner*—Brian Sircus
*Assistant Examiner*—Ann T. Hoang
(74) *Attorney, Agent, or Firm*—Harness, Dickey & Pierce, P.L.C.

(57) ABSTRACT

Power switches are provided with measures for preventing a recommendation of the arc from the secondary current path to the main current path and/or measures for returning the current limiter during the recommutation of the light art. A corresponding arrangement for carrying out the method is provided with means in the power switch and/or current limiter for preventing a switch failure of the current limiter disposed in the secondary current path of the power switch. The current limiter can be especially a PTC current limiter.

36 Claims, 4 Drawing Sheets

U.S. PATENT DOCUMENTS

| | | | | |
|---|---|---|---|---|
| 6,757,462 | B2 * | 6/2004 | Verdrager et al. | 385/37 |
| 2003/0002778 | A1 * | 1/2003 | Bach et al. | 385/16 |
| 2003/0020591 | A1 * | 1/2003 | Choi et al. | 338/22 R |

FOREIGN PATENT DOCUMENTS

| | | |
|---|---|---|
| DE | 3824027 | 7/1988 |
| DE | 4243314 | 12/1992 |
| EP | 0025918 | 9/1980 |
| EP | 0350825 | 7/1989 |

* cited by examiner

METHOD FOR OPERATING A SWITCH WITH A CONNECTABLE CURRENT LIMITER AND CORRESPONDING ARRANGEMENT

This application is the national phase under 35 U.S.C. § 371 of PCT International Application No. PCT/DE02/01229 which has an International filing date of Apr. 4, 2002, which designated the United States of America and which claims priority on German Patent Application number DE 101 18 746.7 filed Apr. 17, 2001, the entire contents of which are hereby incorporated herein by reference.

FIELD OF THE INVENTION

The invention generally relates to a method for operation of a switching device having a switchable current limiter. In this case, the expression switching device may include, in particular, circuit breakers or contactors, and possibly semiconductor switches or the like, as well. In addition, the invention also generally relates to an arrangement for carrying out the method.

BACKGROUND OF THE INVENTION

Switching devices protect electrical power supply systems and loads in the event of a short circuit by rapidly building up a sufficiently high switching voltage. As a result of this, the short-circuit current is limited, and is interrupted after a short time. In order to increase the current limiting effect, the switching voltage that is used can be increased by connecting the switching device in series with a separate current limiter. According to the prior art, the limiter is for this purpose connected in the main circuit, so that the load current flows through it all the time, both during normal operation and in the event of a short circuit.

There are various technical solutions for limiters. In addition to conventional mechanical switches which produce switching arcs, PTC limiters are used for current limiting, in which the build up of voltage when switching occurs is produced by increasing the electrical resistance of the limiter material and/or by way of a gas discharge with a high burning voltage.

In comparison to mechanical switches, PTC limiters have the advantage that the switching voltage is built up very quickly. The disadvantage is the greater cold electrical resistance. As a result of this, the rated current must be limited during rated operation in order to prevent unacceptable heating of the PTC material, for example as a result of motor starting currents, and unintentional response of the limiter. In one known commercial product (ABB PROLIM), a circuit breaker, acting as a switching device, and a PTC limiter are specifically electrically connected in series in the main circuit.

Another possible solution for the rated current problem is described in EP 0 657 062 B1, in which a limiter for a circuit breaker is connected in an auxiliary current path, through which current flows only briefly, when switching occurs. The auxiliary current path is formed from the arc guide rails and the quenching chamber, and is connected by the commutation of the arc from the switching contacts onto the guide rails.

In comparison to conventional circuits in which a circuit breaker and a limiter are connected in series, there is, however, a risk of switching failure, with the switching arc possibly being commutated back to the main current path, when the limiter is connected in the auxiliary current path.

When commutation back such as this occurs, the switching arc or the arc attachment point is moved back from the auxiliary current path to the main current path, for example to the switching contacts. As a result of this, although no current passes through the limiter, it does, however, generally retain its resistance at that time. If another attempt is made for the arc to commutate into the switching chamber, the limiter switching voltage must then be overcome in addition which, in some circumstances, makes the commutation process so difficult that it can fail.

DE 42 43 314 A discloses a current-limiting circuit breaker with an arc quenching device and an auxiliary current path with at least one PTC thermistor and an overvoltage suppressor associated with it. In both devices, the switching from the current-limiting mode to the non-current-limiting mode takes place in a corresponding manner to the overcurrent decay. Furthermore, U.S. Pat. No. 5,777,286 discloses an electrical switching device with separate contacts, which can be disconnected mechanically, and with an arc switching contact associated with this, in which case a PTC thermistor or the like can be connected in the auxiliary circuit. Furthermore, EP 0 350 825 A2 discloses an electrical switching device with an arc quenching device and a current limiting device in the auxiliary circuit.

SUMMARY OF THE INVENTION

An object of an embodiment of the invention is to specify a method for operation of a switching device having a current limiter in the auxiliary current path, in which there is no possibility of a switching failure caused by commutation back to the main current path. A further aim is to provide associated arrangements.

Advantageous embodiments include embodiments of the current limiter, which is, in particular, in the form of a PTC limiter, on the one hand, and/or of the switching device, which is in the form of a circuit breaker, on the other hand.

An embodiment of the invention provides in particular the functional reliability of a combination specifically comprising a circuit breaker and a limiter in the auxiliary circuit. However, embodiments of the invention are also applicable to other switching devices and current limiters.

BRIEF DESCRIPTION OF THE DRAWINGS

Further details and advantages of the invention will become evident from the following description of the figures relating to exemplary embodiments, and with reference to the drawings, in conjunction with the patent claims. In the figures:

DETAILED DESCRIPTION OF THE PREFERRED EMBODIMENTS

Parts which are identical or have the same effect have the same reference symbols in the figures. Two measures according to an embodiment of the invention are essentially described, by which, individually or in conjunction, the problem of switching failure of PTC limiters in the auxiliary current path of circuit breakers can be avoided.

Figure 1:
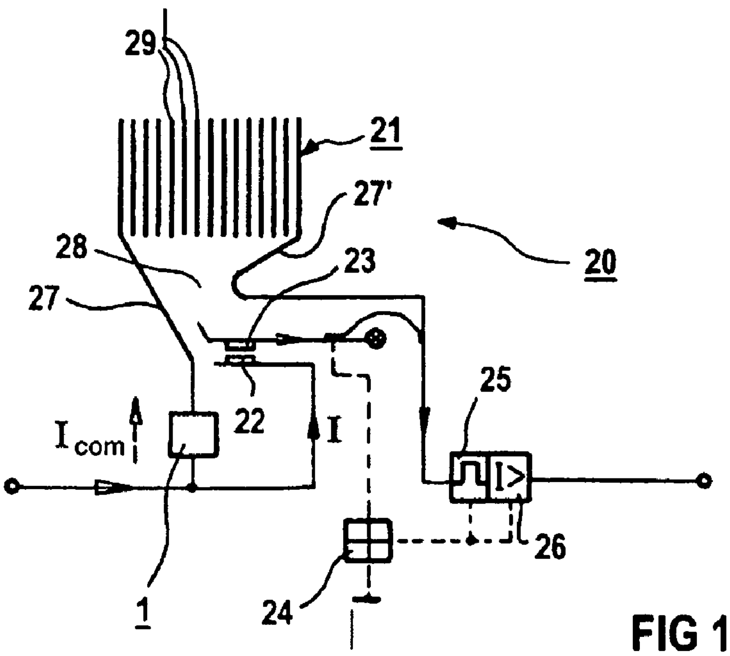
FIG. 1 shows the combination of a circuit breaker with a current limiter in the auxiliary current path of the circuit breaker.

FIG. 1 shows a schematic illustration of the arrangement of a limiter in the auxiliary current path of a circuit breaker, as is described by way of example in EP 0 657 062 B1.

In FIG. 1, a current-limiting circuit breaker 20 contains at least two contacts 22 and 23, at least one of which is designed to move and can be opened and closed via a switching mechanism 24 which can be tripped by a thermal and/or magnetic release 25 or 26, respectively. Each contact 22 and 23 has a respectively associated arc guide rail 27 and 27', which surround an initial chamber area 28 and open into a quenching chamber 21 with a large number of splitter plates 29 for quenching an arc, which is not illustrated in FIG. 1. The initial chamber area 28 and the quenching chamber 21 may together form a switching chamber. Once the arc foot points have been struck, the arc moves on the guide rails 27 and 27' into the quenching chamber 21 with splitter plates 29, where an arc voltage is built up that is sufficiently high for current limiting and arc quenching.

In the case of very high short-circuit currents, for example $I_K$=50 to 100 KA, the increase in the arc voltage is no longer sufficient to limit the current flowing through the switch to non-critical levels. It is then possible for the switching device to be damaged or destroyed. In order to avoid these undesirable consequences, a limiter 1 is connected upstream of the circuit breaker 20 in the auxiliary current path in FIG. 1.

The limiter 1 is a current-limiting element which is not connected in the main current path in a corresponding manner to that in EP 0 657 062 B1, but forms an auxiliary current path in the switching device 20, being passed to an arc guide rail 27. The auxiliary current path for a commutation current $I_{com}$ is defined in FIG. 1 as a current path in parallel with the main current path for a current i that is to be switched. Current flows through it when the arc attaches itself to this guide rail as a result of striking of a foot point.

The limiter 1 as shown in FIG. 1 is advantageously in the form of a PTC limiter. A PTC limiter 1 such as this is illustrated schematically in FIG. 2 and comprises two planar electrodes 10, between which a resistance body 5 composed of some suitable material (e.g., a polymer material) is clamped in, with a force K acting on it. The resistance body 5 has surfaces 2 and 3 and the electrodes 10 have surfaces 11. A PTC limiter such as this for current limiting operates as explained in detail in EP 0 657 062 B1.

Figure 3:
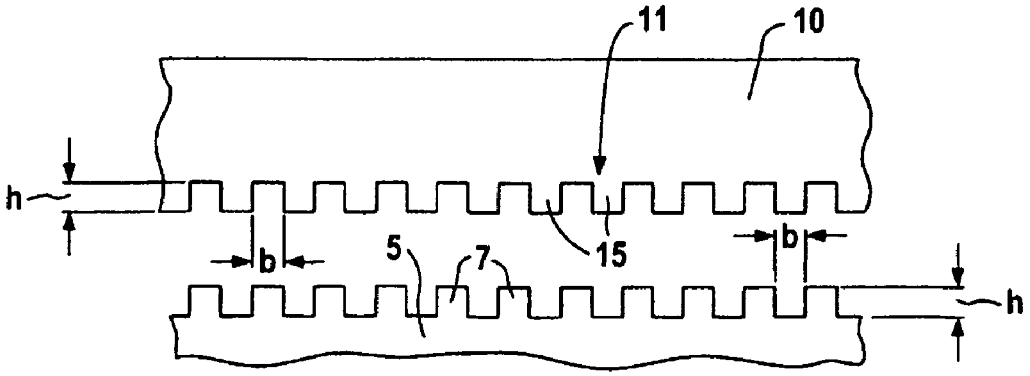
FIG. 3 shows the profile of the electrodes and of the resistance body in the PTC limiter as shown in FIG. 2.

As can be seen from FIG. 3, the flat electrode 10 has profiling 15 rather than having a smooth surface 11, and this profiling 15 has a square-wave structure with a web width b and web height h. The web width b may be between 0.1 and 1 mm, and the web height h may likewise be between 0.1 and 1 mm. In particular, the web width b and the web height h are of the same order of magnitude, preferably between 0.3 and 0.6 mm. The resistance body 5 has complementary profiling 7 on both surfaces 2 and 3. The resistance body 5 and the flat electrodes 10 are connected to one another, such that they cannot be detached, via the profiling 7 and 15.

In an embodiment different to that shown in FIG. 3, the profiling 7 and 15 may also be at an inclination angle with respect to the surface of the flat electrode. The configuration of the profiling influences the way in which the PTC limiter 1 operates.

Figure 4:
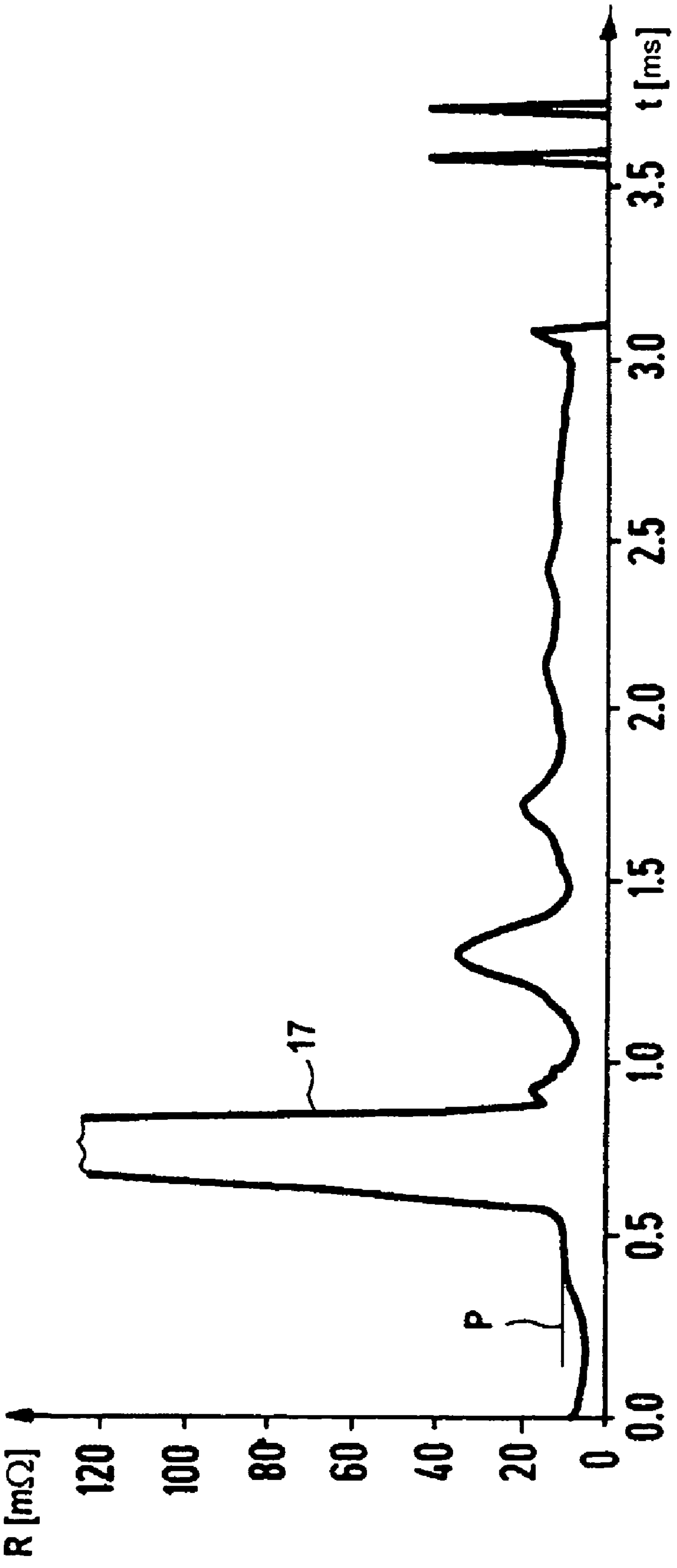
FIG. 4 shows an illustration, in the form of a graph, of the resistance as a function of time for an arrangement as shown in FIGS. 2 and 3.

FIG. 4 shows a switching oscillogram for the PTC limiter 1 with profiling 15 on the electrodes 10 and with a complementary surface profile 7 on the PTC resistance body 5, as is described in detail in EP 0 717 876 B1. The time profile of the limiter resistance R when the PTC limiter 1 is interrupting a short circuit can be seen from the curve 17. At the commencement of the short-circuit current, the limiter resistance starts from its initial value R0≈4 mΩ, and increases slightly. After about 300 μs, it reaches a first plateau level P at about 8 mΩ. While the short-circuit current rises further and reaches the value of 5 kA, 500 μs after the start of the short circuit, the resistance curve changes to a steep rise at this time, and remains for about 300 μs at resistance values which are considerably greater than 100 mΩ. About 900 μs after the start of the short circuit, the limiter resistance once again falls back to a low resistance value of about 15 mΩ, and then decreases to its initial value.

Figure 2:
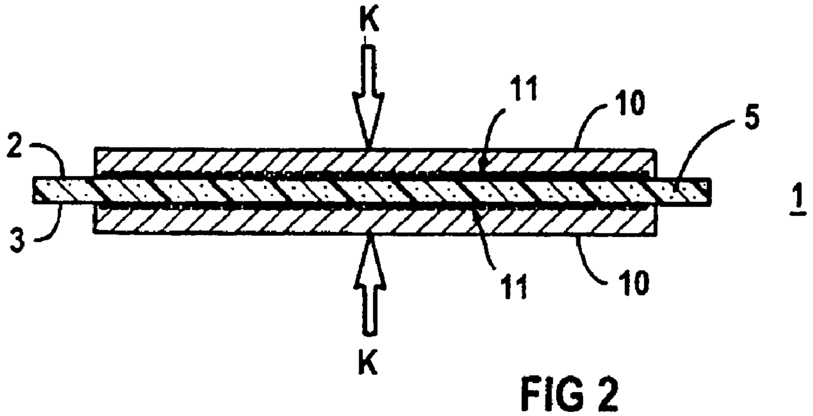
FIG. 2 shows a current limiter in the form of a PTC limiter.

The combination of the characteristics of the arrangement comprising a circuit breaker and current limiter as shown in FIG. 1 and the embodiment of the PTC limiter 1 as a current limiter as shown in FIGS. 2 to 4 makes it possible for the limiter 1 to be reset in a time period of a few tenths of a millisecond from the high-resistance state, that is to say the switched state, to the low-resistance state by reducing the current, when an arc is commutated back from the auxiliary current path to the main current path. The additional voltage required for renewed commutation of the switching arc from the main current path to the auxiliary current path is quantitatively produced by the product of the instantaneous current and the resetting resistance of the limiter.

In the example shown in FIG. 4, the resetting resistance is about two to four times the cold resistance. In order not to exceed the additional commutation voltage of, for example, 50 V with a resetting resistance of about 10 mΩ, the current passing through the short circuit must therefore not exceed 5 kA. Thus, the resetting resistance of the PTC limiter 1 must therefore be designed to match the magnitude of the current being passed through it and the maximum commutation voltage.

Figure 5:
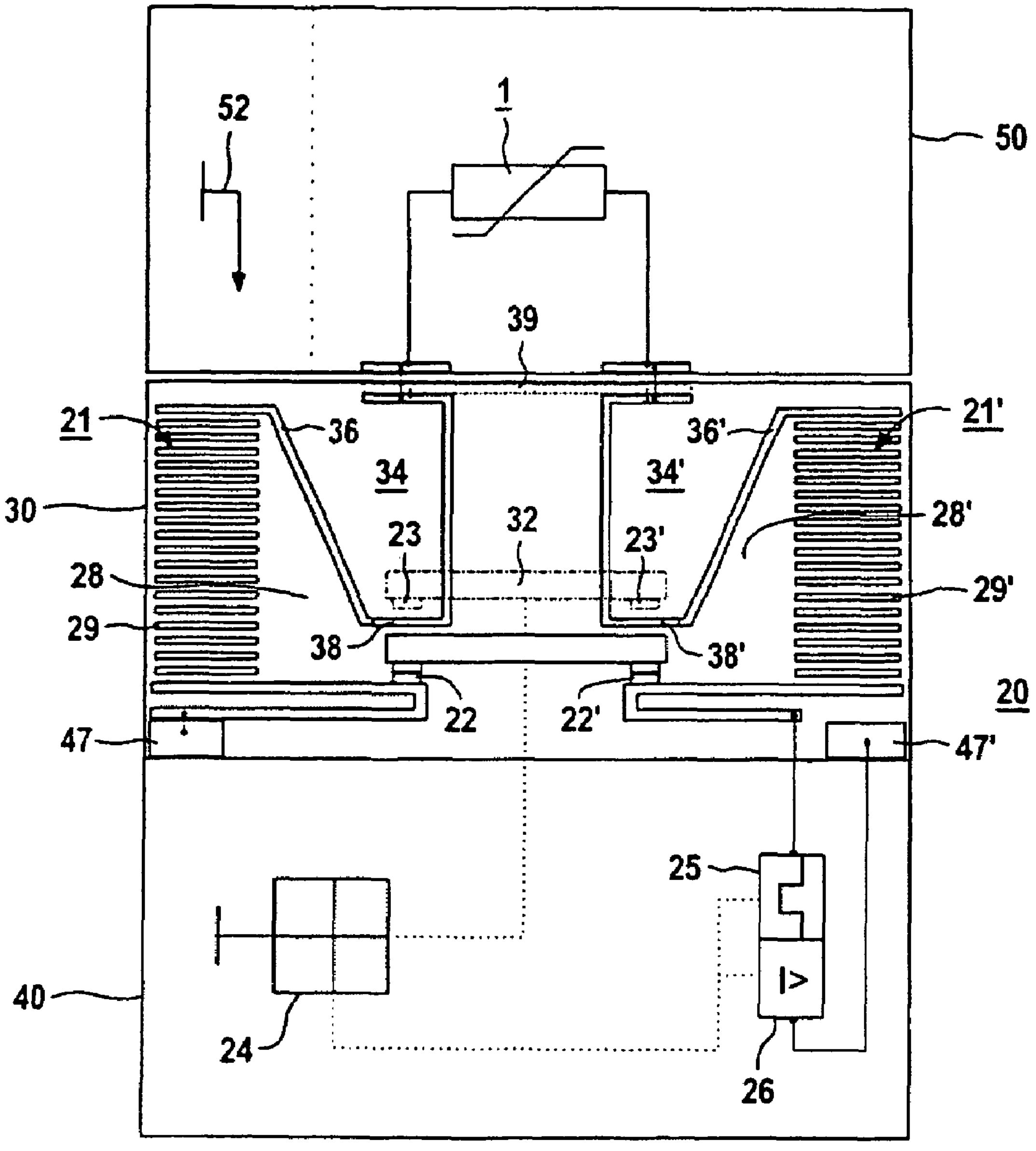
FIG. 5 shows a symmetrical circuit breaker with a switching link and limiter added to it.

FIG. 5 shows a circuit breaker 20 with a PTC limiter 1 in the auxiliary current path, as is shown in a comparable manner in FIG. 1. The major difference is the symmetrical configuration of the switching part 30 of the circuit breaker 20, with a switching link 32 and a double switching chamber, with respective guide rails 36, 36' and splitter plates 29, 29', and with the limiter being connected in this symmetrical switching chamber arrangement. The designations of the functional parts correspond essentially to those in FIG. 1. For example, each switching chamber may include an initial chamber area 28 (or 28') and an arc splitter chamber 21 (or 21').

As in FIG. 1, the limiter 1 in FIG. 5 is also loaded by the arrangement of the current limiter 1 in the auxiliary current path of the circuit breaker 20 only during switching operations. The switching chamber current path is used as the auxiliary current path and, once the switching link 32 has been opened, is connected by the arc commutating from the switching link 32 to the adjacent guide rails 36 and 36'.

In FIG. 5, the current limiter has its own enclosure 50, which is fitted to the enclosure 30 of the circuit breaker 20 and includes an extension 52 for mechanical operation of the switching mechanism 24.

When the limiter 1 is not connected, then the circuit breaker 20 contains, instead of this, a guide rail link 39 for connection of the two guide rails 36, 36'. FIG. 5 shows the switching link 32 in the closed position by way of a solid line, and in the open position by way of a dashed line. The current path passes from one of the connections 47, 47' into the drive part 40 of the circuit breaker 20, which in turn, as shown in FIG. 1, contains the switching mechanism 24, the overcurrent release 25 and the short-circuit release 26. In consequence, when a short circuit occurs, the short-circuit release 26 can open the switching link 32 of the circuit breaker 20 without any delay.

The limiter 1 is connected to a connection point between the two guide rails 36 and 36', which have an associated switching link 32 and are used as arc guide rails. Current does not flow through the limiter 1 until the arc attachment has commutated from the link contact to the adjacent guide rail in both switching chambers. The necessity for simultaneous arc commutation results in the additional voltage requirement being distributed between the two switching paths, as a result of the voltage drop across the limiter 1. This splitting effect also makes it easier for repeated commutation from the main current path to the auxiliary current path once the arc has commutated back onto the switching link.

As a further effect, the double interruption indicates that the switching arc cannot move back from the auxiliary current path to the main current path unless this backward movement takes place in both switching chambers.

As a particular measure to prevent arcs from commutating backwards in this way, the configuration of the guide rails 36, 36' creates an area which is largely screened from the respective arc splitter chamber 21 or 21' and the associated initial chamber area 28 or 28', and this area 34, 34' holds the link contacts 23, 23' when the switching device 20 is in the open position.

Figure 6:
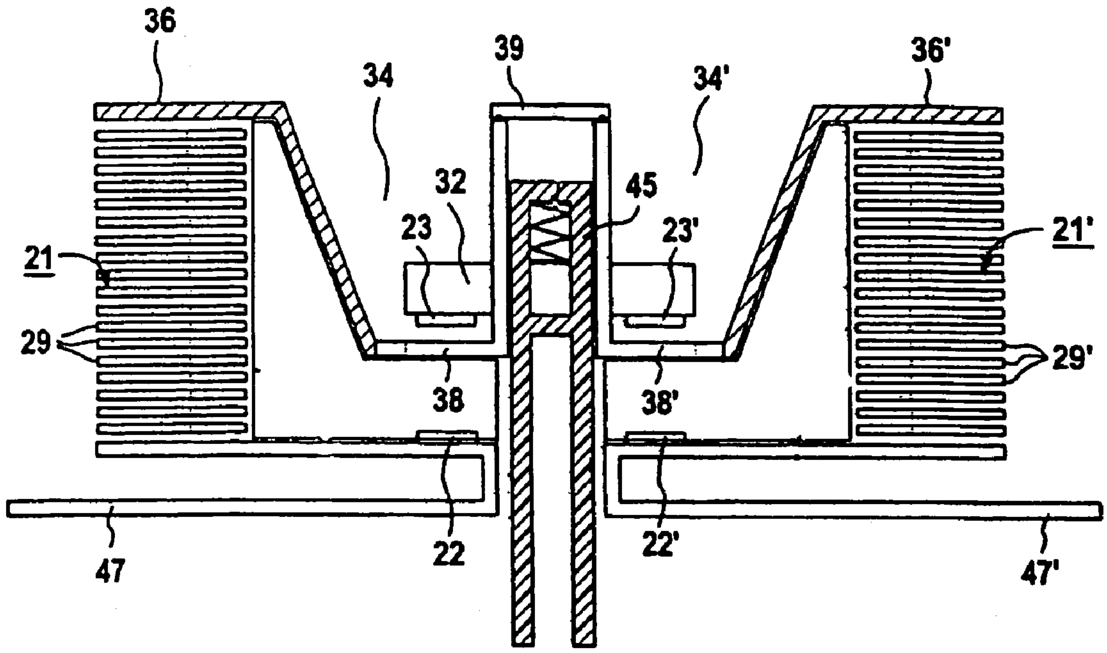
FIG. 6 shows a detail from FIG. 5, with switching chambers in the circuit breaker, which is in the form of a double-interrupting circuit breaker.
Figure 7:
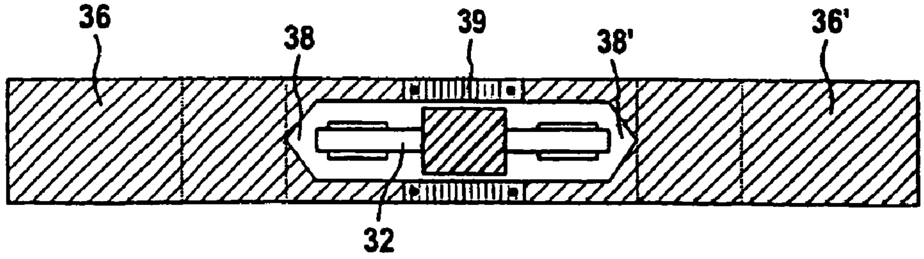
FIG. 7 shows a plan view of the outer guide rails of the switching chambers, with apertures.

In FIG. 6, an aperture 38 or 38' has been incorporated in the guide rails 36, 36', respectively, which are associated with the switching link 32 being in the open position, and this can clearly be seen in detail in the plan view in FIG. 7. The aperture 38 or 38' in the guide rails screens the switching link 32 in the open position from the splitter plates 29, 29' and from the initial chamber area 28, 28', thus preventing arcs from restriking on the switching link 32. This ensures that the limiter function does not cease if arcs are restruck in the initial chamber area 28, 28'.

As mentioned, FIG. 6 shows the switching link in the open position, in which the distance between the link contacts 23, 23' and the stationary contacts 22, 22' is considerably greater than the distance between the guide rails 36, 36' and the stationary contacts. This result in the arc burning voltage creates a voltage difference which assists the arc commutation and makes it harder for the arc to commutate backwards.

The screening geometry of the guide rails 36, 36' prevents arc plasma from being able to flow out of the arc splitter chambers 21, 21' or from the initial chamber areas 28, 28' directly to the switching link 32, and causing flashovers from the switching link 32 to the guide rails 36, 36' or to the stationary contacts 23, 23'.

As can clearly be seen from FIG. 7, the switching link 32 passes through the aperture 38, 38' in the guide rails 36, 36' during the opening movement. The chosen geometry results, in a known manner, in a magnetic field being formed, by means of which the arc or arcs is or are driven onto the cutout edge, and is or are split. The link mount 45 for movement of the switching link 32 is at the same time used for electrical isolation between the two switching chambers of the double-interrupting circuit breaker 20.

Particularly in the case of the example described with reference to FIGS. 5 to 7, the circuit breaker is in the form of an individual switching device with the capability for connection of a limiter. The limiter connecting point is for this purpose connected by means of a guide rail link. A mechanical extension 52 for switching the circuit breaker on and off is provided, if required, for the combination of a circuit breaker and limiter.

Instead of fitting the limiter to the circuit breaker, a high-current version of the circuit breaker can be provided with a limiter that is integrated in the breaker enclosure.

Examples have been used to show that a circuit breaker is particularly suitable for the combination according to the invention of the switching device with a suitable current limiter. However, a contactor or a semiconductor switch can also be used in a corresponding manner as the switching device. However, arc switching elements are required, in particular for switching without any arcs.

For the practical implementation of the invention, the switching device and the current limiter can also advantageously include system engineering means. For example, the current commutation can be improved by isolating media, such as moving slides, a cover on the main current path/contact point. Use with single-interrupting and/or double-interrupting contact arrangements has been described. In this case, the switching contacts can be provided with a linear opening movement, or else with a rotary opening movement. Additionally or alternatively, current limiters which have been described in detail with reference to the figures may also be used in the form of a limiter with an additional switching chamber/contact point, or else a solid-state limiter. Special quick-action releases, for example a piezo-element for switching to the auxiliary current path at low power levels, can be used for early identification of short circuits. Finally, electronic tripping is also possible.

The described arrangements also allow communication with monitoring of switching states and/or of the life of the contacts or an indication of the remaining life, as well as an indication of the limiter life by addition of the short circuits.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for operation of a switching device having a switching chamber, at least one main current path and an associated auxiliary current path, wherein the switching device includes a quenching device for an arc and a PTC limiter, adapted to switch from a non-current-limiting mode to a current-limiting mode and adapted to form a switching voltage when there is a high current load, comprising:

resetting the PTC limiter if the arc commutates back from the auxiliary current path to the main current path, whereby the current in the auxiliary current path decreases to a low value or to zero; and resetting the PTC limiter from the current-limiting mode to the non-current-limiting mode in a time period of <1 ms, after the current in the auxiliary current path decreases to a low value or to zero.

2. The method as claimed in claim 1, wherein the arc at the same time interrupts the main current path and connects the auxiliary current path by commutation from the main current path to the auxiliary current path.

3. The method as claimed in claim 2, wherein the PTC limiter has a resetting resistance for resetting to the non-current-limiting mode that is chosen as a function of the forward current and the maximum commutation voltage.

4. The method as claimed in claim 2, wherein the switching device, including the PTC limiter, is included in a switchgear assembly having means for communication of at least one of switching states of the switching device and characteristics of switching contacts.

5. The method as claimed in claim 1, wherein no values of PTC limiter switching voltage may be overcome when the arc commutates into the switching chamber.

6. The method as claimed in claim 1, wherein the switching device is a double-interrupting circuit breaker with two switching chambers per switching pole.

7. The method as claimed in claim 1, wherein the PTC limiter has a resetting resistance for resetting to the non-current-limiting mode that is chosen as a function of a forward current and a maximum commutation voltage.

8. The method as claimed in claim 1, wherein the switching device, including the PTC limiter, is included in a switchgear assembly having means for communication of at least one of switching states of the switching device and characteristics of switching contacts.

9. A switching device, adapted to perform the method of claim 1.

10. An arrangement, comprising:

a switching device having switching contacts inclusive of stationary contacts and link contacts, arc guide rails associated with the switching contacts, and two switching chambers having initial chamber areas contiguous with arc splitter chambers, respectively; and a current limiter in an auxiliary current path of the switching device;

wherein the current limiter includes a PTC limiter to prevent switching failure of the current limiter, the PTC limiter including a resistance body composed of polymer, made to be electrically conductive, between two metallic electrodes under pressure, and including profiled electrodes and complementary surface profiles in the resistance body wherein the current limiter is connected to a connection point of the arc guide rails;

wherein for preventing arcs from commutating back, the arc guide rails are adapted to screen the link contacts from the arc splitter chambers and from the initial chamber areas; and wherein the current limiter is resettable from a current-limiting mode to a non-current limiting mode in a time period of <1 ms.

11. The arrangement as claimed in claim 10, wherein the profile depth of the electrode is between 1/10 mm and 5/10 mm.

12. The arrangement as claimed in claim 10, wherein the profile edges are inclined with respect to the electrode surface.

13. The arrangement as claimed in claim 12, wherein opposite profile edges of the electrode are inclined with respect to the electrode surface.

14. The arrangement as claimed in claim 13, wherein a link mount for movement of a switching link is used for electrical isolation between the two switching chambers.

15. The arrangement as claimed in claim 13, wherein the switching device is in the form of a single switching device with the capability for the current limiter to be connected.

16. The arrangement as claimed in claim 15, wherein the connecting point of the current limiter to the switching device is connected by way of a guide rail link.

17. The arrangement as claimed in claim 16, wherein, when the current limiter is connected in the auxiliary circuit, the guide rail link is replaced by the current limiter.

18. The arrangement as claimed in claim 17, wherein the current limiter is arranged in its own enclosure.

19. The arrangement as claimed in claim 18, wherein a current limiter enclosure is adapted to be fitted to a switching device enclosure.

20. The arrangement as claimed in claim 19, wherein a mechanical extension for switching the switching device on and off is provided in the enclosure of the current limiter.

21. The arrangement as claimed in claim 10, wherein current flows through the current limiter when the arc is commutated from at least one of the link contacts to the adjacent guide rail in the two switching chambers.

22. The arrangement as claimed in claim 21, wherein a link mount for movement of a switching link is used for electrical isolation between the two switching chambers.

23. The arrangement as claimed in claim 21, wherein the switching device is in the form of a single switching device with the capability for the current limiter to be connected.

24. The arrangement as claimed in claim 10, wherein a switching link supports the link contact such that the distance between the link contacts and the stationary contact when the switching link is in the open position is greater than the distance between the guide rail and the stationary contact.

25. The arrangement as claimed in claim 24, wherein the screening geometry of the guide rails prevents arc plasma from flowing from at least one of the arc splitter chamber and the initial chamber area to the switching link.

26. The arrangement as claimed in claim 25, wherein the link mount for movement of the switching link is also used for electrical isolation between the two switching chambers of the circuit breaker.

27. The arrangement as claimed in claim 25, wherein the switching device is in the form of a single switching device with the capability for the current limiter to be connected.

28. The arrangement as claimed in claim 24, wherein the link mount for movement of the switching link is also used for electrical isolation between the two switching chambers of the circuit breaker.

29. The arrangement as claimed in claim 24, wherein the switching device is in the form of a single switching device with the capability for the current limiter to be connected.

30. A method for operation of a switching device having at least one main current path and an associated auxiliary current path, wherein the switching device includes a PTC limiter and is switchable between a non-current-limiting mode and a current-limiting mode, comprising:

resetting the PTC limiter if an arc commutates from the auxiliary current path to the main current path; and resetting the PTC limiter from the current-limiting mode to the non-current-limiting mode in a time period of <1 ms.

31. The method as claimed in claim 30, wherein the arc at the same time interrupts the main current path and connects the auxiliary current path by commutation from the main current path to the auxiliary current path.

32. The method as claimed in claim 30, wherein no values of current limiter switching voltage may be overcome upon the arc commutating into the switching chamber.

33. The method as claimed in claim 30, wherein the circuit breaker is a double-interrupting circuit breaker with two switching chambers per switching pole.

34. The method as claimed in claim 30, wherein the PTC limiter has a resetting resistance for resetting to the non-current-limiting mode that is chosen as a function of the forward current and the maximum commutation voltage.

35. The method as claimed in claim 30, wherein the switching device, including the PTC limiter, is included in a switchgear assembly having means for communication of at least one of switching states of the switching device and characteristics of the switching contacts.

36. An arrangement for operation of a switching device having at least one main current path and an associated auxiliary current path, wherein the switching device includes a PTC limiter and is switchable between a non-current-limiting mode and a current-limiting mode, comprising:

means for resetting the PTC limiter from the current-limiting mode go the non-current-limiting mode in a time period of <1 ms; and means for resetting the PTC limiter if an arc commutates from the auxiliary current path to the main current path.

* * * * *